US012614761B2

(12) United States Patent
Onodera et al.

(10) Patent No.: US 12,614,761 B2
(45) Date of Patent: Apr. 28, 2026

(54) NONAQUEOUS ELECTROLYTE SECONDARY BATTERY, AND METHOD FOR FABRICATING NONAQUEOUS ELECTROLYTE SECONDARY BATTERY

(71) Applicant: Prime Planet Energy & Solutions, Inc., Tokyo (JP)

(72) Inventors: Naoto Onodera, Kobe (JP); Hideki Sano, Ikeda (JP); Daisuke Nishide, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 891 days.

(21) Appl. No.: 17/826,166

(22) Filed: May 27, 2022

(65) Prior Publication Data

US 2022/0393252 A1     Dec. 8, 2022

(30) Foreign Application Priority Data

May 28, 2021     (JP) ................................. 2021-090498

(51) Int. Cl.
*H01M 10/0587*          (2010.01)
*H01M 10/0525*          (2010.01)
(Continued)

(52) U.S. Cl.
CPC ... *H01M 10/0587* (2013.01); *H01M 10/0525* (2013.01); *H01M 10/446* (2013.01); *H01M 50/183* (2021.01); *H01M 50/538* (2021.01)

(58) Field of Classification Search
CPC .......... H01M 10/0587; H01M 50/538; H01M 50/183; H01M 10/0525; H01M 10/446
See application file for complete search history.

(56) References Cited

U.S. PATENT DOCUMENTS 6,376,121 B1 *  4/2002  Inomata ............ H01M 10/0431
                                                         429/231.95
2002/0006540 A1 *  1/2002  Enomoto .......... H01M 10/0587
                                                         29/623.2
(Continued)

FOREIGN PATENT DOCUMENTS

CN          103201894 A      7/2013
CN          104067411 A      9/2014
(Continued)

OTHER PUBLICATIONS

Merriam Webster Definition of "Strip" noun, Accessed Apr. 9, 2025.*

(Continued)

*Primary Examiner* — Marla D Mcconnell
*Assistant Examiner* — Olivia A Jones
(74) *Attorney, Agent, or Firm* — HAUPTMAN HAM, LLP

(57) ABSTRACT

A technique for suppressing formation of a black region in a wound electrode body is provided. A method for fabricating a nonaqueous electrolyte secondary battery disclosed here includes: an assembly step of constructing a secondary battery assembly including a wound electrode body; and an initial charging step of performing initial charging on the secondary battery assembly. In the initial charging step, the secondary battery assembly is charged at a first charging rate until a negative electrode potential with respect to a lithium metal reference (vs. Li/Li+) of the secondary battery assembly reaches at least 0.5 V, and a remaining gas amount of the wound electrode body at the end of the initial charging step is 58 cc or less.

10 Claims, 6 Drawing Sheets

(51) Int. Cl.
H01M 10/44 (2006.01)
H01M 50/183 (2021.01)
H01M 50/538 (2021.01)

(56) References Cited

U.S. PATENT DOCUMENTS

| | | | |
|---|---|---|---|
| 2002/0034678 A1 | 3/2002 | Shibuya et al. | |
| 2002/0055047 A1* | 5/2002 | Satoh | H01M 4/133 |
| | | | 429/231.95 |
| 2005/0221187 A1* | 10/2005 | Inagaki | H01M 4/131 |
| | | | 429/231.95 |
| 2009/0239133 A1 | 9/2009 | Kosugi | |
| 2013/0232773 A1 | 9/2013 | Mineya et al. | |
| 2014/0377607 A1 | 12/2014 | Urano | |
| 2015/0194640 A1* | 7/2015 | Tsukuda | H01M 10/0468 |
| | | | 429/185 |
| 2015/0244032 A1 | 8/2015 | Yamamoto et al. | |
| 2016/0099481 A1 | 4/2016 | Akagawa et al. | |
| 2016/0380299 A1 | 12/2016 | Umeyama et al. | |
| 2017/0263979 A1 | 9/2017 | Hanazaki | |
| 2017/0346138 A1 | 11/2017 | Umeyama et al. | |
| 2018/0034097 A1 | 2/2018 | Uwai et al. | |
| 2020/0161698 A1* | 5/2020 | Higuchi | H01M 10/0525 |
| 2020/0266493 A1 | 8/2020 | Toi et al. | |
| 2021/0066764 A1 | 3/2021 | Ikeda | |
| 2021/0135320 A1 | 5/2021 | Murata et al. | |
| 2021/0184267 A1 | 6/2021 | Tanaka et al. | |

FOREIGN PATENT DOCUMENTS

| | | | | | | |
|---|---|---|---|---|---|---|
| CN | 105164847 A | | 12/2015 | | | |
| CN | 106299444 A | | 1/2017 | | | |
| CN | 112335116 A | | 2/2021 | | | |
| JP | H06-084545 A | | 3/1994 | | | |
| JP | H08293320 A | | 11/1996 | | | |
| JP | 2001283914 A | | 10/2001 | | | |
| JP | 2007-005069 A | | 1/2007 | | | |
| JP | 2008-226625 A | | 9/2008 | | | |
| JP | 2010021104 A | * | 1/2010 | | | |
| JP | 2010528404 A | | 8/2010 | | | |
| JP | 2011-082093 A | | 4/2011 | | | |
| JP | 2012084346 A | | 4/2012 | | | |
| JP | 2013125650 A | * | 6/2013 | | | |
| JP | 2013182712 A | | 9/2013 | | | |
| JP | 2015-099725 A | | 5/2015 | | | |
| JP | 2015162261 A | | 9/2015 | | | |
| JP | 2015176771 A | | 10/2015 | | | |
| JP | 2015228289 A | | 12/2015 | | | |
| JP | 2019029097 A | | 2/2019 | | | |
| KR | 2002002200 A | * | 1/2002 | ........ | H01M 10/0569 |
| KR | 20170035565 A | * | 3/2017 | .......... | H01M 10/446 |
| KR | 10-2021-0027111 A | | 3/2021 | | | |
| WO | 2008100090 A1 | | 8/2008 | | | |
| WO | 2015136937 A1 | | 9/2015 | | | |
| WO | 2016132444 A1 | | 8/2016 | | | |
| WO | 2019044560 A1 | | 3/2019 | | | |
| WO | 2020/059131 A1 | | 3/2020 | | | |

OTHER PUBLICATIONS

Daojun Yang, Xiaojie Li, Ningning Wu, Wenhuai Tian, Effect of moisture content on the electrochemical performance of LiNi1/3Co1/3Mn1/3O2/graphite battery, Electrochimica Acta, vol. 188, 2016, pp. 611-618, ISSN 0013-4686, https://doi.org/10.1016/j.electacta.2015.12.063. (Year: 2016).*

Machine Translation Relied Upon for Application KR-2002002200-A (Year: 2002).*

Machine Translation Relied Upon for Application JP-2013125650-A (Year: 2013).*

Machine Translation Relied Upon for KR-20170035565-A (Year: 2017).*

Machine Translation Relief Upon for JP-2013125650-A (Year: 2013).*

Daojun Yang, Xiaojie Li, Ningning Wu, Wenhuai Tian; Effect of moisture content on the electrochemical performance of LiNi1/3Co1/3Mn1/3O2/graphite battery; Electrochimica Acta; vol. 188, pp. 611-618, ISSN 0013-4686, https://doi.org/10.1016/j.electacta.2015.12.063. (Year: 2016).*

Machine Translation Relied Upon for JP-2010021104-A.*

Non-Final Office Action mailed Nov. 27, 2024 in U.S. Appl. No. 17/702,722, 12 pp.

Notice of Allowance mailed Apr. 1, 2025 in U.S. Appl. No. 17/702,722, 8 pp.

* cited by examiner

24

NONAQUEOUS ELECTROLYTE SECONDARY BATTERY, AND METHOD FOR FABRICATING NONAQUEOUS ELECTROLYTE SECONDARY BATTERY

CROSS REFERENCE TO RELATED APPLICATIONS

This application claims the benefit of priority to Japanese Patent Application No. 2021-090498 filed on May 28, 2021. The entire contents of this application are hereby incorporated herein by reference.

BACKGROUND OF THE DISCLOSURE

1. Technical Field

The present disclosure relates to a nonaqueous electrolyte secondary battery and a method for fabricating a nonaqueous electrolyte secondary battery.

2. Background

Secondary batteries such as lithium ion secondary batteries have been widely used in various fields including vehicles and portable terminals in recent years. A typical example of a secondary battery of this type is a nonaqueous electrolyte secondary battery including an electrode body having a positive electrode plate and a negative electrode plate, a nonaqueous electrolyte, and a battery case housing the electrode body and the nonaqueous electrolyte.

In fabricating a nonaqueous electrolyte secondary battery, a secondary battery assembly in which an electrode body and a nonaqueous electrolyte are housed in a battery case is initially charged in general. The initial charging causes a so-called SEI film to be formed on the surface of a negative electrode plate. On the other hand, in the initial charging, a gas derived from components included in the secondary battery assembly can be generated in the electrode body. In regard to this, in a lithium ion secondary battery (nonaqueous electrolyte secondary battery) production method described in International Patent Publication No. 2016/132444, a pre-charging step and a gas discharge step of discharging a gas generated in the pre-charging step are performed before an initial charging step of charging a lithium ion secondary battery to a fully charged state. This publication describes that deposition of lithium metal on the surface of a negative electrode can be prevented in the initial charging step.

As an electrode body included in a nonaqueous electrolyte secondary battery, a flat wound electrode body in which a strip positive electrode plate and a strip negative electrode plate are wound with a strip separator interposed therebetween is employed in some cases. With recent widespread use of secondary batteries, nonaqueous electrolyte secondary batteries have been required of providing highly enhanced energy. To satisfy this requirement, inventors of the present disclosure tried to increase the width of an electrode active material layer (i.e., the length of a wound electrode body in a winding axis direction) in a positive electrode plate or a negative electrode plate, for example. The inventors of the present disclosure, however, newly found that a black region can be formed in a region of the wound electrode body rather than the other region in the process of fabricating a nonaqueous electrolyte secondary battery including a wound electrode body having a large width of an electrode active material layer. The inventors also found that the black region has a higher resistance than the other region, and thus, the nonaqueous electrolyte secondary battery including the wound electrode body with the black region might have poor battery characteristics (e.g., capacity retention rate).

It is therefore an object of the present disclosure to provide a technique for suppressing formation of a black region in a wound electrode body in a nonaqueous electrolyte secondary battery including the wound electrode body.

A nonaqueous electrolyte secondary battery disclosed here includes: a flat wound electrode body including a strip positive electrode plate, a strip negative electrode plate, and a strip separator, the positive electrode plate and the negative electrode plate being wound with the separator interposed therebetween; a nonaqueous electrolyte containing a supporting electrolyte including lithium and fluorine; and a battery case housing the wound electrode body and the nonaqueous electrolyte. The negative electrode plate includes a negative electrode core material and a negative electrode active material layer disposed on the negative electrode core material. The negative electrode active material layer of the wound electrode body in a winding axis direction has a length L of at least 20 cm. The negative electrode plate includes a plurality of negative electrode tabs projecting from one end of the negative electrode plate in the winding axis direction. One of the negative electrode tabs closest to a winding start end of the negative electrode plate includes an end B that is one end of a root of the negative electrode tab in a direction orthogonal to the winding axis, an end C that is another end of the root opposite to the end B, a midpoint E that is a midpoint of a line segment BC connecting the end B and the end C to each other, and a line A that is a line passing through the midpoint E and extending along the winding axis, the negative electrode active material layer includes regions of (1) a center region including a center of the negative electrode active material layer in the winding axis direction, where a length of the center region in the winding axis direction is $\frac{1}{3}L$, and (2) an end region located at a side of the negative electrode tabs or at a side opposite to the negative electrode tabs and adjacent to the center region, where a length of the end region in the winding axis direction is $\frac{1}{3}L$, and when a LiF intensity of a sample obtained from the negative electrode active material layer on the line A is detected by an analysis of an X-ray photoelectron spectroscopy (XPS), a ratio ($I_{center}/I_{end}$) of a LiF intensity $I_{center}$ in the region (1) to a LiF intensity $I_{end}$ in the region (2) is 0.5 or more.

In the nonaqueous electrolyte secondary battery with the configuration described above, formation of a black region in the center region of the negative electrode plate is suppressed. Thus, degradation of battery performance is suppressed.

In another preferred aspect of the nonaqueous electrolyte secondary battery disclosed here, the battery case includes a package and a sealing plate, the package having an opening and a bottom portion opposed to the opening, the sealing plate sealing the opening. The wound electrode body is disposed in the package such that the winding axis is parallel to the bottom portion. Advantages of the technique disclosed here can be appropriately obtained in the nonaqueous electrolyte secondary battery with the configuration described above.

In another preferred aspect of the nonaqueous electrolyte secondary battery disclosed here, the package includes a pair of opposed large-area side walls and a pair of opposed small-area side walls having an area smaller than an area of the large-area side walls. A distance between the pair of large-area side walls is at least 3 cm. The wound electrode body comprises a plurality of wound electrode bodies housed in the package. As described above, in the nonaqueous electrolyte secondary battery disclosed here, degradation of battery performance is suppressed. Thus, the plurality of wound electrode bodies enable energy to be obtained from the nonaqueous electrolyte secondary battery more efficiently.

In another preferred aspect of the nonaqueous electrolyte secondary battery disclosed here, the nonaqueous electrolyte secondary battery includes a positive electrode current collector and a negative electrode current collector electrically connected to the wound electrode body. The positive electrode plate includes a plurality of positive electrode tabs projecting from one end of the positive electrode plate in the winding axis direction. The wound electrode body includes a negative electrode tab group and a positive electrode tab group, the negative electrode tab group being located at one end of the wound electrode body in the winding axis direction and including the plurality of negative electrode tabs, the positive electrode tab group being located at another end of the wound electrode body in the winding axis direction and including the plurality of positive electrode tabs. The positive electrode current collector is connected to the positive electrode tab group. The negative electrode current collector is connected to the negative electrode tab group. Advantages of the technique disclosed here can be appropriately obtained in the nonaqueous electrolyte secondary battery with the configuration described above.

A fabrication method disclosed here is a method for fabricating a nonaqueous electrolyte secondary battery including a flat wound electrode body including a strip positive electrode plate, a strip negative electrode plate, and a strip separator, the positive electrode plate and the negative electrode plate being wound with the separator interposed therebetween, a nonaqueous electrolyte containing a supporting electrolyte including lithium and fluorine, and a battery case housing the wound electrode body and the nonaqueous electrolyte. The method includes: an assembly step of housing the wound electrode body and the nonaqueous electrolyte in the battery case to construct a secondary battery assembly; and an initial charging step of performing initial charging on the secondary battery assembly. In the initial charging step, the secondary battery assembly is charged at a first charging rate until a negative electrode potential with respect to a lithium metal reference (vs. Li/Li+) of the secondary battery assembly reaches at least 0.5 V, and an amount of a gas remaining in the wound electrode body at end of the initial charging step is 58 cc or less.

A study of the inventors of the present disclosure shows that a gas is easily generated in a period from the start of initial charging to the time when the potential reaches the negative electrode potential. In the fabrication method described above, the battery is charged at a specific charging rate of the first charging rate in a period from the start of initial charging to when the potential reaches the predetermined negative electrode potential. Accordingly, gas generation in the wound electrode body in the initial charging step can be suppressed. A study of the inventors of the present disclosure also found that formation of a black region can be suppressed in the wound electrode body by charging performed such that the remaining gas amount in the wound electrode body after initial charging is 58 cc or less. Thus, with this fabrication method, formation of a black region in the nonaqueous electrolyte secondary battery is suppressed so that degradation of battery performance can be suppressed.

In a preferred aspect of the fabrication method disclosed here, the first charging rate is 0.3 It or less. With this method, advantages of the technique disclosed here can be appropriately obtained.

In another preferred aspect of the fabrication method disclosed here, the first charging rate is 0.05 It or more. With this method, advantages of the technique disclosed here can be appropriately obtained.

In another preferred aspect of the fabrication method disclosed here, after the negative electrode potential reaches 0.5 V, the secondary battery assembly is charged at a second charging rate greater than 0.3 It and 1.0 It or less. As described above, charging is performed at a specific charging rate in a period until the negative electrode potential reaches 0.5 V (i.e., a period in which a gas is easily generated), and gas generation is suppressed. Thus, after the period, even when the charging rate is changed, advantages of the technique disclosed here can be suitably obtained.

In another preferred aspect of the fabrication method disclosed here, in the assembly step, the secondary battery assembly is assembled such that the secondary battery assembly has a moisture content of 300 ppm or less. With this method, the amount of generation of a gas derived from moisture in the secondary battery assembly can be reduced, in addition to the advantages described above.

In another preferred aspect of the fabrication method disclosed here, the battery case includes a package and a sealing plate, the package having an opening and a bottom portion opposed to the opening, the sealing plate sealing the opening. The wound electrode body is disposed in the package such that the winding axis is parallel to the bottom portion. Advantages of the technique disclosed here can be appropriately obtained in the nonaqueous electrolyte secondary battery with the configuration described above.

In another preferred aspect of the fabrication method disclosed here, the package includes a pair of opposed large-area side walls and a pair of opposed small-area side walls having an area smaller than an area of the large-area side walls. A distance between the pair of large-area side walls is at least 3 cm. The wound electrode body comprises a plurality of wound electrode bodies housed in the package. As described above, in the nonaqueous electrolyte secondary battery disclosed here, degradation of battery performance is suppressed. Thus, the plurality of wound electrode bodies enable energy to be obtained from the nonaqueous electrolyte secondary battery more efficiently. In addition, from the viewpoint of releasing a gas, providing the plurality of wound electrode bodies is more preferable than the increase of the size of the wound electrode body in order to efficiently obtain energy.

In another preferred aspect of the fabrication method disclosed here, the secondary battery assembly comprises a positive electrode current collector and a negative electrode current collector electrically connected to the wound electrode body. The positive electrode plate includes a plurality of positive electrode tabs projecting from one end of the positive electrode plate in the winding axis direction. The wound electrode body includes a negative electrode tab group and a positive electrode tab group, the negative electrode tab group being located at one end of the wound electrode body in the winding axis direction and including the plurality of negative electrode tabs, the positive electrode tab group being located at another end of the wound electrode body in the winding axis direction and including the plurality of positive electrode tabs, The positive electrode current collector is connected to the positive electrode tab group. The negative electrode current collector is connected to the negative electrode tab group. From the viewpoint of releasing a gas, a configuration including a tab group as a stack of electrode core material exposed portions cut into tabs is more preferable than a configuration in which strip electrode core material exposed portions are wound to be united.

BRIEF DESCRIPTION OF THE DRAWINGS

FIG. 2 is a schematic transverse cross-sectional view taken along line II-II in

FIG. 1.

DETAILED DESCRIPTION OF THE PREFERRED EMBODIMENTS

Figure 1:
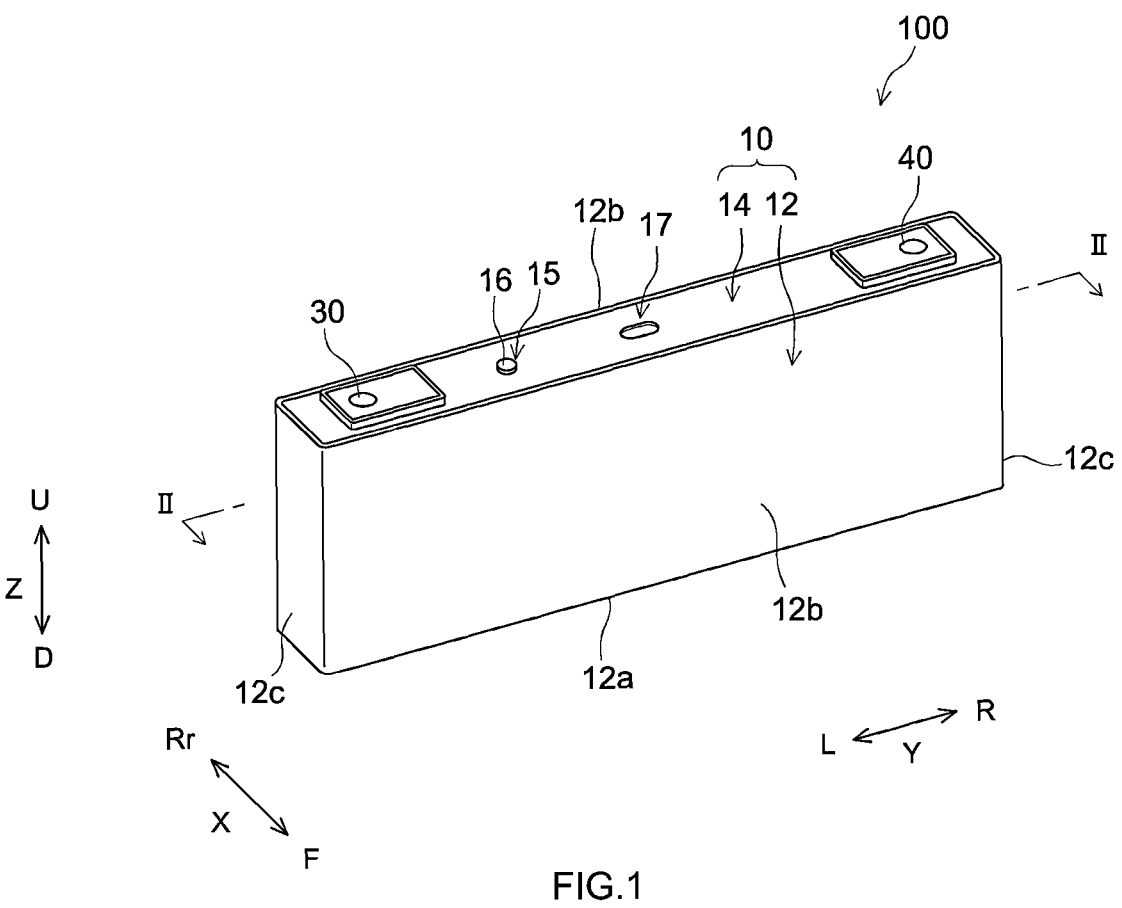
FIG. 1 is a perspective view schematically illustrating a nonaqueous electrolyte secondary battery fabricated with a fabrication method according to one preferred embodiment.

A preferred embodiment of the technique disclosed here will be described hereinafter with reference to the drawings. Matter not specifically mentioned herein but required for carrying out the technique disclosed here (e.g., a general configuration and fabrication process of a nonaqueous electrolyte secondary battery that do not characterize the technique disclosed here) can be understood as design matter of those skilled in the art based on related art in the field. The technique disclosed here can be carried out on the basis of the contents disclosed herein and common general knowledge in the field.

A "secondary battery" herein is a general term for storage devices enabling repetitive charging and discharging, and generally includes so-called storage batteries (chemical cells) such as a lithium ion secondary battery and capacitors (physical cells) such as an electric double-layer capacitor. An "active material" herein refers to a material that can reversibly store and release carriers (e.g., lithium ions). A "level of charge" herein refers to a charging rate (charge amount from initial state/battery capacity of secondary battery assembly×100) where a fully charged state of a secondary battery assembly (nonaqueous electrolyte secondary battery) is 100%, and will also be referred to as a state of charge (SOC).

In the drawings referred to herein, character X denotes a "depth direction," character Y denotes a "width direction," and character Z denotes a "height direction." In the depth direction X, F represents "front" and Rr represents "rear." In the width direction Y, L represents "left" and R represents "right." In the height direction Z, U represents "up" and D represents "down." It should be noted that these directions are defined merely for convenience of description, and do not limit the state of installation of the secondary battery. The expression "A to B" indicating a numerical range herein includes "A or more and B or less" as well as "greater than A and less than B." In the drawings, members and parts having the same functions are denoted by the same reference characters for description.

Figure 2:
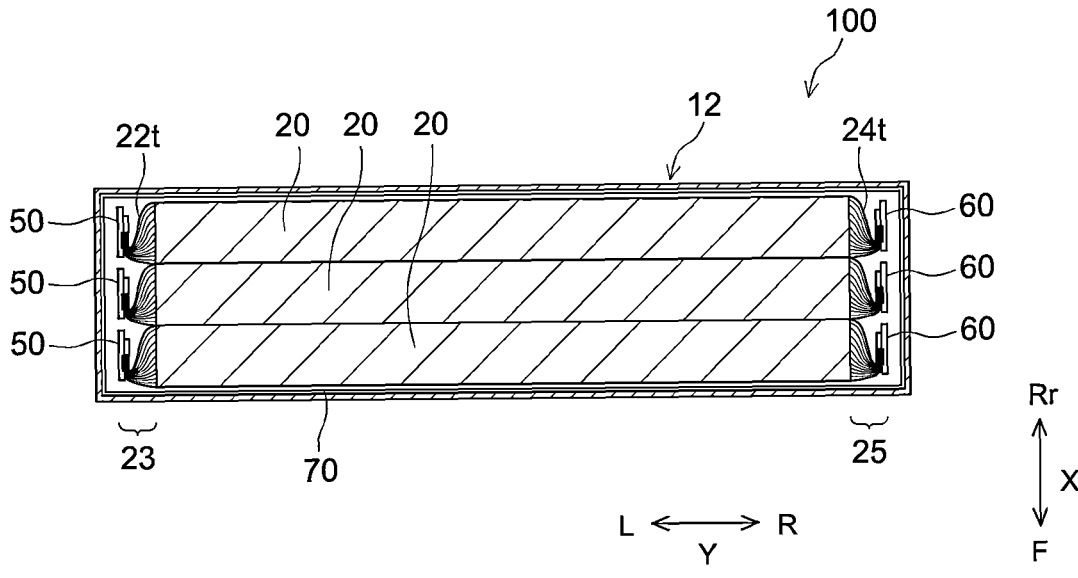

FIGS. 1 and 2 illustrate an example of a nonaqueous electrolyte secondary battery obtained by a fabrication method disclosed here. A nonaqueous electrolyte secondary battery 100 includes a wound electrode body 20, an unillustrated nonaqueous electrolyte, and a battery case 10 housing the wound electrode body and the nonaqueous electrolyte. The nonaqueous electrolyte secondary battery 100 is a lithium ion secondary battery here.

The nonaqueous electrolyte can contain a nonaqueous solvent and a supporting electrolyte. As the nonaqueous solvent, an organic solvent such as various types of carbonates used for typical lithium ion secondary batteries can be used without any particular limitation. Specific examples of the carbonates include: chain carbonates such as dimethyl carbonate (DMC), ethyl methyl carbonate (EMC), and diethyl carbonate (DEC); cyclic carbonates such as ethylene carbonate (EC), propylene carbonate (PC), butylene carbonate (BC), methylethylene carbonate, and ethylethylene carbonate; fluorinated chain carbonates such as methyl 2,2,2-trifluoroethyl carbonate (MTFEC); and fluorinated cyclic carbonates such as monofluoroethylene carbonate (FEC) and difluoroethylene carbonate (DFEC). These nonaqueous solvents may be used alone or in combination of two or more of them. The nonaqueous solvent is preferably cyclic carbonate. In particular, ethylene carbonate (EC) is preferably used.

The supporting electrolyte includes a supporting electrolyte including lithium and fluorine. Examples of the supporting electrolyte include lithium salts such as $LiPF_6$, $LiBF_4$, lithiumbis(fluorosulfonyl)imide (LiFSI), and lithiumbis(trifluoromethane)sulfonimide (LiTFSI). In particular, $LiPF_6$ is preferably used. The concentration of the supporting electrolyte in the nonaqueous electrolyte is 0.7 mol/L to 1.3 mol/L.

The nonaqueous electrolyte is not specifically limited, and preferably includes a film forming agent. The nonaqueous electrolyte can include, as the film forming agent, one or more compounds selected from the group consisting of an oxalato complex compound (e.g., lithiumbis(oxalato)borate (LiBOB)) including boron (B) atoms and/or phosphorus (P) atoms, vinylene carbonate (VC), and difluoro lithium phosphate.

As components other than the components described above, the nonaqueous electrolyte can include a gas generating agent such as biphenyl (BP) or cyclohexylbenzene (CHB). Additives known to date such as a thickener and/or a dispersant can be included as long as these additives do not significantly impair advantages of the technique disclosed here.

The battery case 10 includes a package 12 having an opening and a sealing plate (lid) 14 that seals the opening. The battery case 10 is integrated and hermetically sealed (made airtight) by joining the sealing plate 14 to the periphery of the opening of the package 12. The package 12 is a bottomed prism-shaped package including the opening, a rectangular bottom portion 12a opposed to the opening, a pair of large-area side walls 12b extending upward from long sides of the bottom portion 12a, and a pair of small-area side walls 12c extending upward from short sides of the bottom portion 12a. The small-area side walls 12c have an area smaller than the area of the large-area side walls 12b. The sealing plate 14 includes an injection hole 15 for the nonaqueous electrolyte, a gas release valve 17, a positive electrode terminal 30, and a negative electrode terminal 40. The injection hole 15 is sealed by a sealing member 16. The positive electrode terminal 30 ad the negative electrode terminal 40 are electrically connected to the wound electrode body 20 housed in the battery case 10. The battery case 10 is made of, for example, a metal. Examples of a metal material constituting the battery case 10 include aluminium, an aluminium alloy, iron, and an iron alloy.

The battery case 10 is not limited to a specific size. In a case where a plurality of wound electrode bodies 20 are housed in the package 12 in some aspects, which will be described later, the distance between the pair of large-area side walls 12b can be appropriately set in accordance with the number and the size of the wound electrode bodies 20 housed in the package 12. The distance is preferably at least 3 cm, and may be 3 cm or more, 4 cm or more, or 5 cm or more, for example. The distance may be, for example, 10 cm or less, 8 cm or less, or 6 cm or less.

The wound electrode bodies 20 are power generation elements of the nonaqueous electrolyte secondary battery 100, and each include a positive electrode plate, a negative electrode plate, and a separator. In this preferred embodiment, as illustrated in FIG. 2, a plurality of (e.g., two or more, three or more, or four or more, and three in FIG. 2) wound electrode bodies 20 are housed in the battery case 10 (package 12) and arranged in the depth direction X. As illustrated in FIGS. 1 through 4, the wound electrode bodies 20 are disposed in the package 12 with a winding axis WL being in parallel to the bottom portion 12a. The wound electrode bodies 20 housed in an electrode body holder 70 are housed in the battery case 10, but the present disclosure is not limited to this example. As materials for the members (e.g., the positive electrode plate, the negative electrode plate, and the separator) constituting each wound electrode body 20, materials that can be used in a typical nonaqueous electrolyte secondary battery can be used without any particular limitation. Since the materials described above do not limit the technique disclosed here, detailed description thereof will be omitted.

A length L1 of each wound electrode body 20 in the winding axis WL is at least 20 cm, and can be, for example, 20 cm or more, 25 cm or more, or 30 cm or more. The length L1 is preferably 50 cm or less, more preferably 40 cm or less, and much more preferably 35 cm or less. The length L1 does not include any of the length of positive electrode tabs 22t and the length of negative electrode tabs 24t described later.

A length H of each wound electrode body in the height direction Z is, for example, 70 mm to 150 mm, but the present disclosure is not limited to this example. A ratio (L1/H) of the length L1 to the length H is approximately 2.0 or more, is preferably 5.0 or less, and more preferably 4.0 or less. A thickness W of each wound electrode body 20 is preferably 30 mm or less (e.g., 20 mm or less), but the present disclosure is not limited to this example.

Both ends of each wound electrode body 20 in the thickness direction (depth direction X) are constituted by a pair of wide flat surfaces 20a. Each of the flat surfaces 20a of the wound electrode body 20 includes a center portion 201 including a center line CL of the flat surface 20a in the winding axis direction of the wound electrode body 20, and two end portions 202 and 203 sandwiching the center portion 201 in the winding axis direction. A ratio (L2/L1) of the length L2 of the center portion 201 to the length L1 of each flat surface 20a in the winding axis direction can be, for example, ⅙ or more, or ¼ or more, and ½ or less, or ⅓ or less. The expression "including the center line CL" means that it is sufficient to include the center line CL in the center portion 201, for example, the distance between a center line (not shown) of the center portion 201 and the center line CL is ¼L2 or less. The length of each of the end portions 202 and 203 in the winding axis direction can be appropriately set in accordance with the length L2.

Figure 3:
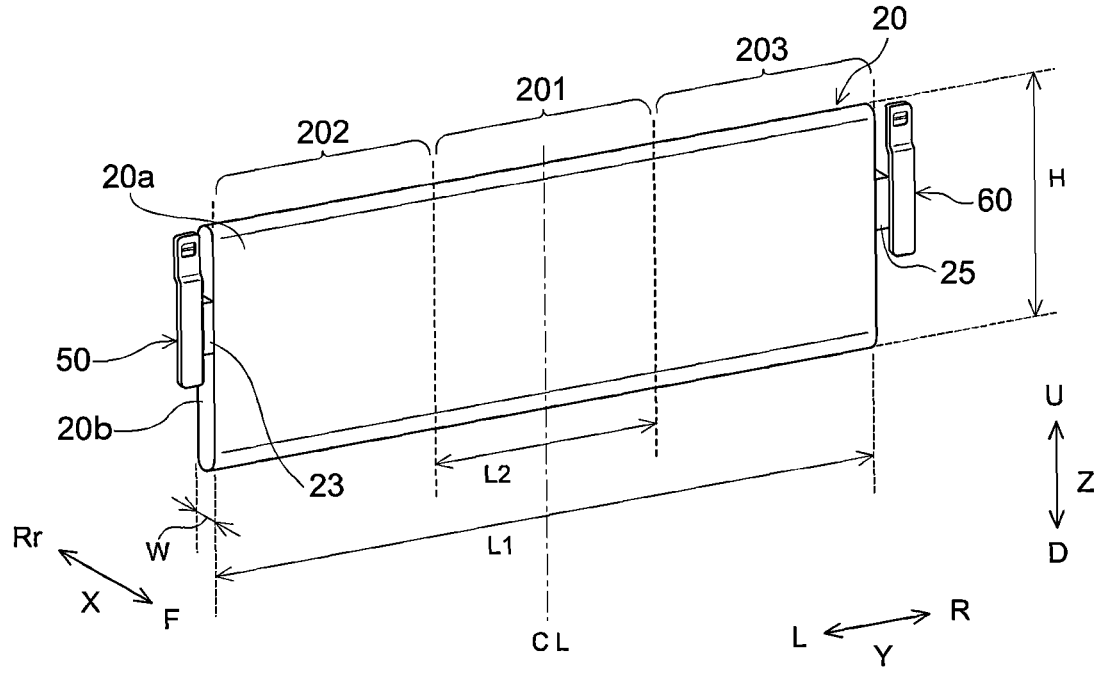
FIG. 3 is a perspective view schematically illustrating a wound electrode body used in a fabrication method according to one preferred embodiment.
Figure 4:
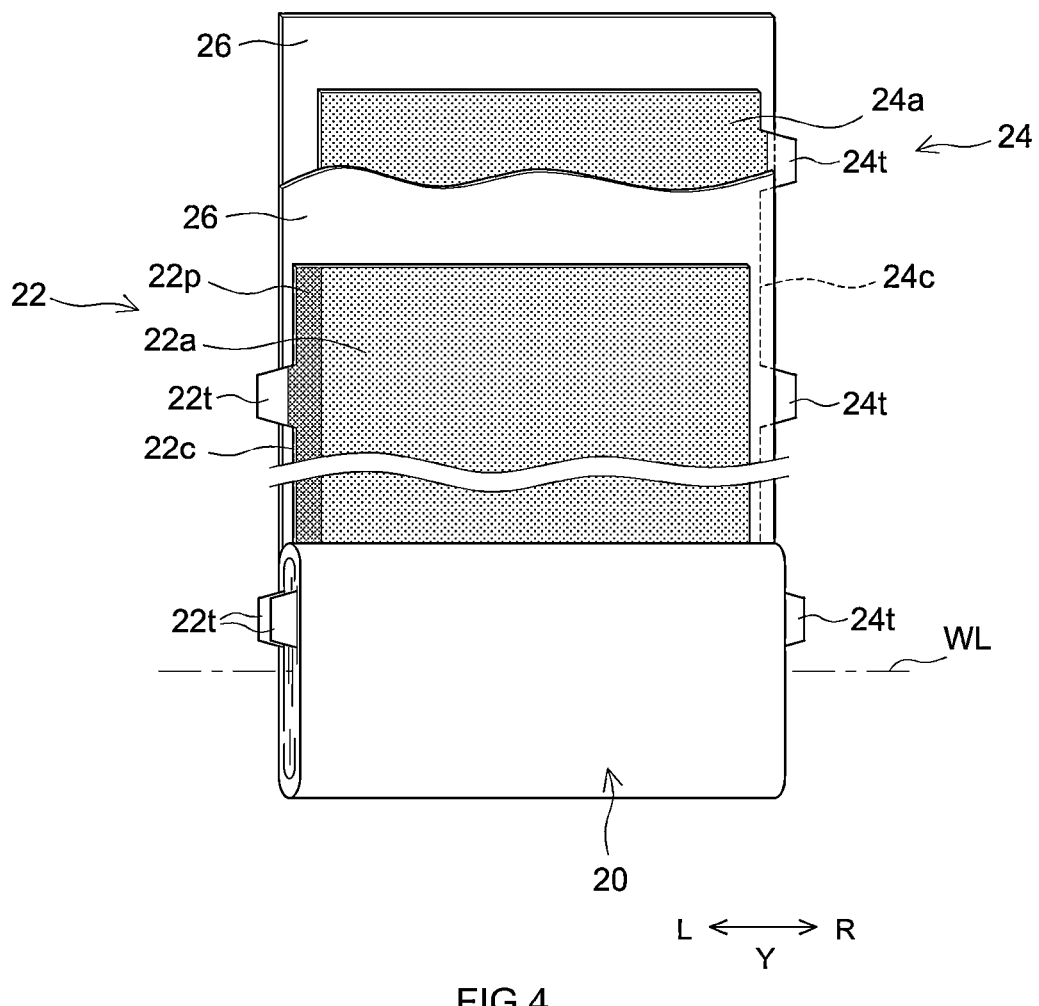
FIG. 4 is a schematic view illustrating a configuration of a wound electrode body used in a fabrication method according to one preferred embodiment.

As illustrated in FIG. 4, each wound electrode body 20 includes a positive electrode plate 22 and a negative electrode plate 24. The wound electrode body 20 here is a flat wound electrode body formed by winding the long strip positive electrode plate 22 and the long strip negative electrode plate 24 about the winding axis WL with a long strip separator 26 interposed therebetween. The winding axis WL is orthogonal to the longitudinal direction. As illustrated in FIG. 3, both ends of the wound electrode body 20 in the width direction Y are constituted by a stacked surface 20b of the positive electrode plate 22, the negative electrode plate 24, and the separator 26. The stacked surface 20b is open to the outside of the wound electrode body 20.

The positive electrode plate 22 includes a long strip positive electrode core material 22c (e.g., aluminium foil or aluminium alloy foil), and a positive electrode active material layer 22a fixed to at least one surface (preferably both surfaces) of the positive electrode core material 22c and containing a positive electrode active material (e.g., lithium nickel cobalt manganese mixed oxide (NCM)). A positive electrode protective layer 22p may be provided on one side edge portion of the positive electrode plate 22 in the width direction Y when necessary, but the present disclosure is not limited to this example. A plurality of positive electrode tabs 22t are provided on one end portion (left end portion in FIG. 4) of the positive electrode core material 22c in the width direction Y. Each of the plurality of positive electrode tabs 22t projects in one direction (to the left in FIG. 4) in the width direction Y. The plurality of positive electrode tabs 22t are disposed with intervals (intermittently) along the longitudinal direction of the positive electrode plate 22. The positive electrode tabs 22t are a part of the positive electrode core material 22c where none of the positive electrode active material layer 22a and the positive electrode protective layer 22p are formed (core material exposed portion). The plurality of positive electrode tabs 22t are stacked at end (left end in FIG. 4) in the width direction Y, and constitute a positive electrode tab group 23 including the plurality of positive electrode tabs 22t. A positive electrode current collector 50 is joined to the positive electrode tab group 23 (see FIGS. 2 through 4).

The size of the positive electrode plate 22 can be set to obtain the length L1 of the wound electrode body 20. The length of the positive electrode plate 22 along the winding axis WL can be set at, for example, 20 cm or more, 25 cm or more, or 30 cm or more. The length can be, for example, 50 cm or less, 40 cm or less, or 35 cm or less. The length does not include the length of the positive electrode tabs 22t.

The negative electrode plate 24 includes a long strip negative electrode core material 24c (e.g., copper foil or copper alloy foil), and a negative electrode active material layer 24a fixed to at least one surface (preferably both surfaces) of the negative electrode core material 24c and containing a negative electrode active material (e.g., graphite). A plurality of negative electrode tabs 24*t* are provided on one end portion (right end portion in FIG. 4) of the negative electrode core material 24*c* in the width direction Y. Each of the plurality of negative electrode tabs 24*t* projects in one direction (to the right in FIG. 4) in the width direction Y. The plurality of negative electrode tabs 24*t* are disposed with intervals (intermittently) along the longitudinal direction of the negative electrode plate 24. The negative electrode tabs 24*t* here are a part of the negative electrode core material 24*c*, where the negative electrode active material layer 24*a* of the negative electrode core material 24*c* is formed (core material exposed portion). The plurality of negative electrode tabs 24*t* are stacked at one end (right end in FIG. 4) in the width direction Y, and constitute a negative electrode tab group 25 including the plurality of negative electrode tabs 24*t*. A negative electrode current collector 60 is joined to the negative electrode tab group 25 (see FIGS. 2 through 4).

The size of the negative electrode plate 24 can be set to obtain the length L1 of the wound electrode body 20. A length (e.g., length L of the negative electrode active material layer 24*a* shown in FIG. 8 in the same direction) of the negative electrode plate 24 along the winding axis WL is at least 20 cm, and can be set at 20 cm or more, 25 cm or more, or 30 cm or more, for example. The length can be, for example, 50 cm or less, 40 cm or less, or 35 cm or less. The length does not include the length of the negative electrode tabs 24*t*.

When initial charging of the secondary battery assembly is performed, the negative electrode active material decomposes an organic substance (e.g., a nonaqueous electrolyte component or an additive such as a film forming agent) that contacts at a predetermined potential or more. Such a decomposed product is deposited as a SEI film on the surface of the negative electrode active material layer. Although the SEI film has no electron conductivity, the SEI coating is not a completely continuous film, and thus, allows ions to pass therethrough. Accordingly, the SEI film stabilizes and/or inactivates the active material surface to thereby suppress excessive decomposition of the nonaqueous electrolyte component and other materials, for example. On the other hand, the initial charging can generate a gas derived from components included in the secondary battery assembly (e.g., moisture, constituents of the nonaqueous electrolyte) in the electrode body. The gas generated in the electrode body is released out of the electrode body from the open surface of the electrode body. If the electrode body has a configuration as that of the wound electrode body 20, for example, the gas is released only from the stacked surface 20*b* that is the open surface of the wound electrode body 20, and thus, part of the gas tends to remain in the electrode body (especially the center portion 201).

As described above, although the SEI film is formed on the surface of the negative electrode active material layer 24*a* after initial charging, charging reaction does not easily occur in a portion where a gas is present, and thus, formation of the SEI film is inhibited. The gas is released out of the wound electrode body 20 by, for example, subsequent aging. The SEI film is insufficiently formed in a portion from which the gas is released, and thus, the nonaqueous electrolyte component and the negative electrode active material rapidly react with each other in a subsequent step. Then, a low-quality layer (black region) having different properties from those of the SEI film is formed. The black region has a higher resistance than the other region, and thus, formation of the black region causes a variation in charging in the wound electrode bodies 20, and might degrade battery performance of the nonaqueous electrolyte secondary battery.

The inventors of the present disclosure first focused on a relationship between the total amount of a gas generated in initial charging and the presence of a black region. A study of the inventors of the present disclosure shows that merely reducing the total amount of the gas generated in initial charging cannot sufficiently suppress formation of a black region, and it is important to control the amount of the gas remaining in the wound electrode body within a predetermined range. It is also found that a gas is easily generated if the negative electrode potential after the start of initial charging is within a predetermined range (specifically, 0.6V to 0.3V (especially 0.5 V or more)). As a result of an intensive study, the inventors found a preferable relationship among the amount of a gas remaining in the wound electrode bodies after initial charging, the negative electrode potential, and a charging rate.

Figure 5:
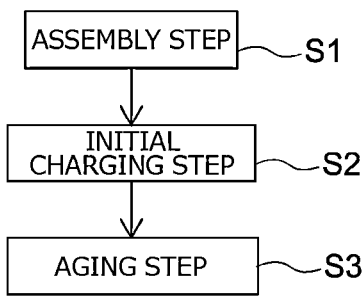
FIG. 5 is a flowchart of a fabrication method according to one preferred embodiment.

As shown in FIG. 5, the fabrication method disclosed here includes an assembly step S1, an initial charging step S2, and an aging step S3. In the assembly step S1, the wound electrode bodies 20 and the nonaqueous electrolyte are housed in the battery case 10 to thereby construct a secondary battery assembly. First, the wound electrode bodies 20 are produced by a known method using the materials described above. Next, the positive electrode current collectors 50 are attached to the positive electrode tab groups 23 of the wound electrode bodies 20, and the negative electrode current collectors 60 are attached to the negative electrode tab group 25 so that combined bodies (first combined bodies) of the wound electrode bodies 20 and electrode current collectors are prepared (see FIG. 3). In this preferred embodiment, three first combined bodies are prepared.

Then, the three first combined bodies and the sealing plate 14 are united, thereby preparing a second combined body. Specifically, a positive electrode terminal 30 previously attached to the sealing plate 14 and the positive electrode current collector 50 of the first combined bodies are joined together, for example. Similarly, a negative electrode terminal 40 previously attached to the sealing plate 14 and the negative electrode current collector 60 of the first combined bodies are joined together. Examples of a technique for the joining include ultrasonic wave joining, resistance welding, and laser welding.

Thereafter, the second combined body is housed in the package 12. Specifically, three wound electrode bodies 20 are housed in the electrode body holder 70 formed by bending an insulative resin sheet (e.g., resin sheet of polyolefin such as polyethylene (PE) in a bag shape or a box shape. The wound electrode bodies 20 covered with the electrode body holder 70 are inserted in the package 12 In this state, the sealing plate 14 is overlaid on the opening portion of the package 12, and the package 12 and the sealing plate 14 are welded together, thereby sealing the package 12. Subsequently, with a known method, a nonaqueous electrolyte is injected into the battery case 10 through the injection hole 15. The wound electrode bodies 20 are impregnated with the injected nonaqueous electrolyte. In this manner, a secondary battery assembly in which the wound electrode bodies 20 and the nonaqueous electrolyte are housed in the battery case 10 is constructed.

In the assembly step S1, the secondary battery assembly is preferably assembled to have a moisture content of 300 ppm or less, but the present disclosure is not limited to this example. The moisture content is preferably 250 ppm or less, more preferably 200 ppm or less, and preferably as small as possible. As an example of the method for fabricating such a secondary battery assembly, a drying step of drying the inside of the battery case 10 is performed after the package 12 housing the wound electrode body 20 is sealed and before the nonaqueous electrolyte is injected as described above. Examples of the drying method include using a drying chamber. Specifically, first, the battery case 10 housing the wound electrode bodies 20 and a heater Y, (e.g., a plate heater or an electric heater) are housed in the drying chamber, and the switch of the heater is turned on so that the inside of the drying chamber is heated. The drying chamber is heated until the internal temperature of the drying chamber reaches a predetermined temperature, and once the temperature has reached the temperature, the temperature is kept for a predetermined time (e.g., 10 minutes to four hours). The temperature is not specifically limited as long as moisture can be sufficiently removed from the inside of the battery case 10 (wound electrode bodies 20), and is preferably 100° C. or more and 150° C. or less, for example. At this time, the drying chamber is preferably decompressed. For example, a vacuum pump is connected to the drying chamber, and the switch of the vacuum pump is turned on so that the inside of the drying chamber is decompressed. The internal pressure of the drying chamber is reduced to a predetermined pressure, and once the pressure has reached the predetermined pressure, the pressure is preferably kept for a predetermined time (e.g., one hour to three hours). This pressure is not specifically limited, and may be, for example, −0.05 MPa or less, −0.08 MPa or less, or −0.09 MPa or less with respect to the atmospheric pressure (0.1 MPa), and is preferably as low as possible.

The method for measuring the moisture content of the secondary battery assembly is not specifically limited, and may be a method using a Karl-Fisher moisture measurement device, for example. For example, a test piece of a predetermined size is prepared from the positive electrode plate or the negative electrode plate of the wound electrode body after the drying step. Next, the moisture content of the test piece is measured by using a commercially available Karl-Fisher moisture measurement device. The moisture contents before and after the drying step are compared, and a decrease in the moisture content by the drying step is detected. The moisture content of the wound electrode body (i.e., moisture content of the secondary battery assembly) is calculated based on Equation (A):

$$\text{Moisture content (ppm)}=(\text{moisture content after drying step})/(\text{weight of wound electrode body})\times 106 \qquad \text{(A)}$$

Figure 6:
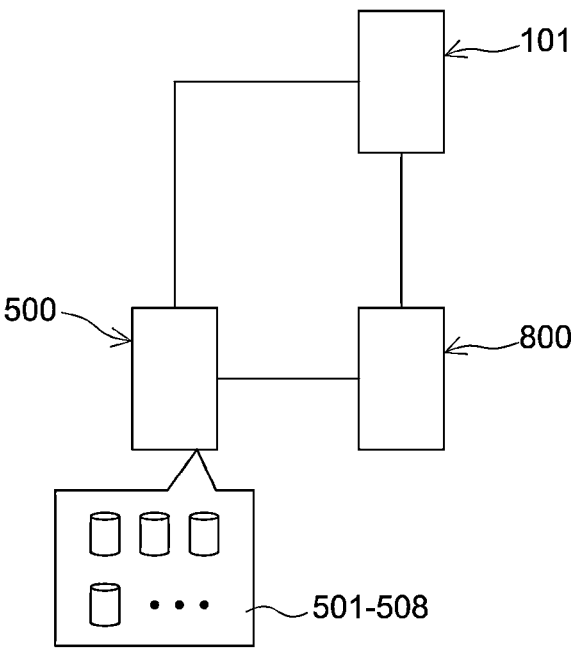
FIG. 6 is a block diagram showing charging/discharging control in a fabrication method according to one preferred embodiment.

In the initial charging step S2, initial charging is performed on the secondary battery assembly. This step includes control of a charging rate in a predetermined mode in accordance with the negative electrode potential of the secondary battery assembly. As illustrated in FIG. 6, charging and discharging of a secondary battery assembly 101 by a charging/discharging section 800 is controlled by a control device 500. The charging/discharging section 800 is a known charging/discharging section for performing a series of charging and discharging of the secondary battery assembly 101 in the fabrication method disclosed here. When the negative electrode potential of the secondary battery assembly 101 reaches 0.5 V as described later, the charging/discharging section 800 acquires information on this.

The control device 500 evaluates a charging state of the secondary battery assembly 101, and based on this evaluation result, controls charging and discharging of the secondary battery assembly 101 by the charging/discharging section 800. The control device 500 includes a CPU that executes a processing program, a ROM that stores the processing program, a RAM that temporarily stores data, input/output ports, a communication port, and sensors. The configuration and processing of the control device 500 can be implemented as, for example, a database that stores data implemented by a computer in a predetermined format, a data structure, a processing module that performs a predetermined computation process according to a predetermined program, or a part of thereof. Processing of the control device 500 may be performed in cooperation with such an external computer. For example, whole or part of information stored in the control device 500 may be stored in an external computer, and whole or part of processing performed by the control device 500 may be executed by an external computer.

As functional blocks that evaluate a charging state of the secondary battery assembly 101 and control charging and discharging of the secondary battery assembly 101 by the charging/discharging section 800, the block control device 500 includes a detector, a map information memory, a memory, a battery information acquirer, a negative electrode potential estimator, an SOC acquirer, and a controller, for example.

The detector is configured to detect a current value (Ib) and a voltage value (Vb) of the secondary battery assembly 101, and can include a current detector 501 and a voltage detector 502. The current detector 501 is connected to an ammeter (not shown) connected to the secondary battery assembly 101 in series, and detects a current value (Ib). The voltage detector 502 is connected to a voltmeter (not shown) connected to the secondary battery assembly 101 in parallel, and detects a voltage value (Vb).

A map information memory 503 stores a negative electrode potential estimation map configured to estimate a negative electrode potential, based on the voltage value (Vb) of the secondary battery assembly 101. In the negative electrode potential estimation map, a correlation between a battery voltage and a negative electrode potential of the secondary battery assembly 101 is recorded. The "negative electrode potential" herein refers to a negative electrode potential with respect to a lithium metal reference (vs. Li/Li+). The map information memory 503 preferably include a plurality of negative electrode potential estimation maps. The plurality of negative electrode potential estimation maps are preferably prepared depending on the type of the secondary battery assembly 101 (e.g., the type of positive and negative electrode active materials included in the secondary battery assembly). The negative electrode potential estimation maps can be created based on a predetermined test. For example, first, a plurality of test secondary batteries adjusted to have different battery voltage values are prepared. Next, each of the test secondary batteries adjusted to the battery voltage value is disassembled, and a negative electrode plate is taken. Each negative electrode potential is measured by using a corresponding negative electrode plate and a counter pole of lithium metal. From the measurement result, a correlation between the battery voltage and the negative electrode potential is acquired, thereby creating a negative electrode potential estimation map.

The memory can include, for example, a basic information memory 504 that stores basic information of the secondary battery assembly 101, and a voltage memory 505 that temporarily stores a voltage (Vb) of the secondary battery assembly 101 during initial charging. Examples of the basic information include the type of the positive and negative electrode active materials included in the secondary battery assembly 101 and the size of the wound electrode body.

A negative electrode potential estimator 506 refers to the negative electrode potential estimation maps stored in the map information memory 503 and estimates a negative electrode potential in the secondary battery assembly 101 during initial charging. At this time, the negative electrode potential estimator 506 refers to a voltage (Vb) of the secondary battery assembly 101 detected by the voltage detector 502.

An SOC acquirer 507 acquires an SOC of the secondary battery assembly 101. For example, a current SOC is obtained by monitoring a charging electricity amount and a discharging electricity amount of the secondary battery assembly 101 from an initial state. The SOC acquirer 507 constantly records a current value (Ib) detected by the current detector 501, and calculates the charging electricity amount and the discharging electricity amount from the initial state.

A controller 508 controls charging and discharging of the secondary battery assembly 101 by the charging/discharging section 800 in cooperation with the current detector 501, the voltage detector 502, the map information memory 503, the basic information memory 504, the voltage memory 505, the negative electrode potential estimator 506, and the SOC acquirer 507. The controller 508 is connected to the charging/discharging section 800. The controller 508 controls a series of charging and discharging of the secondary battery assembly 101 in the initial charging step S2 and other steps.

Charging/discharging control (charging in this example) by the controller 508 will be described below. In starting initial charging of the secondary battery assembly 101, the basic information of the secondary battery assembly 101 is input to the control device 500, a negative electrode potential estimation map for reference is selected, and initial charging (initial charging step S2) is started (START). The initial charging step S2 of the fabrication method disclosed here includes charging of the secondary battery assembly 101 at a first charging rate (first charging) until a negative electrode potential of the secondary battery assembly 101 with respect to the lithium metal reference (vs. Li/Li+) reaches at least 0.5 V.

Figure 7:
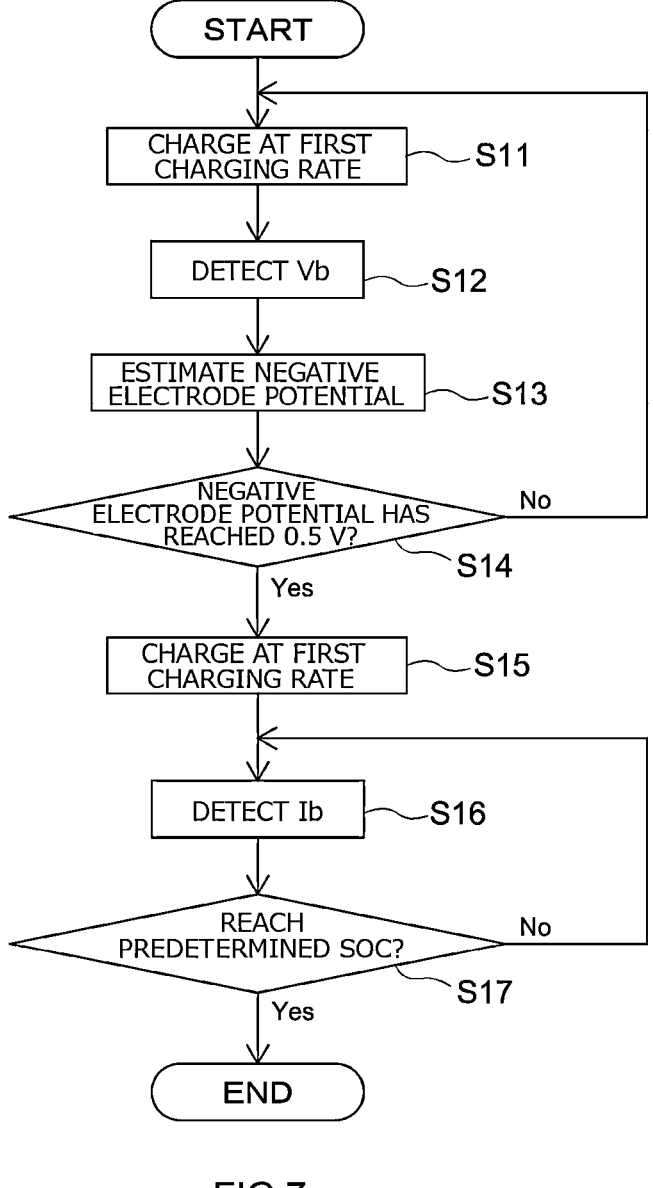
FIG. 7 is a control flowchart of an initial charging step in a fabrication method according to one preferred embodiment.

As shown in FIG. 7, in initial charging, first, the secondary battery assembly 101 is charged at the first charging rate using the charging/discharging section 800 (first charging) (step S11). The first charging rate is set such that in charging the secondary battery assembly as a target of charging is charged to a predetermined SOC, the amount of a gas remaining in the wound electrode body is 58 cc at the end of the initial charging. For example, the first charging rate can be determined by a predetermined test using a test secondary battery assembly. In this test, first, a plurality of test secondary battery assemblies having the same configuration as that of a nonaqueous electrolyte secondary battery as a target of fabrication are prepared as test secondary battery assemblies, for example (see the assembly step S1 for detailed procedure). Next, a nonaqueous electrolyte is injected to battery cases so that the battery cases are filled with the nonaqueous electrolyte. In this state, a funnel is inserted in the injection hole of each of the battery cases, and charging is started. The charging rate in this charging preferably differs among the plurality of prepared test secondary battery assemblies. Then, charging is performed until the potential reaches the predetermined SOC, and a liquid level in the funnel during this charging is observed. The volume of an increase in the liquid level is measured and calculated as a remaining gas amount in the wound electrode body. A charging rate at which the thus-obtained remaining gas amount is 58 cc or less will be referred to as a first charging rate. The remaining gas amount for determining the first charging rate may be 55 cc or less and 53 cc or less. The predetermined SOC may be equal to an SOC when the initial charging step S2 is finished (described in detail later).

The first charging rate varies depending on the type of the secondary battery assembly, and is preferably 0.3 It or less, for example, but the present disclosure is not limited to this example. By setting the first charging rate within such a range, the gas generation amount in initial charging can be reduced, and a gas mixture in the wound electrode body is suppressed so that formation of a black region can be suppressed. From a similar standpoint, the first charging rate may be 0.2 It or less, and 0.1 It or less. The lower limit of the first charging rate is not specifically limited, and may be 0.05 It or more, for example.

Thereafter, the voltage detector 502 detects a voltage (Vb) (step S12). At this time, the voltage memory 505 stores the detected voltage. Subsequently, the negative electrode potential estimator 506 refers to the negative electrode potential estimation maps in the map information memory 503 and the voltage (Vb) stored in the voltage memory 505 as described above, and estimates a negative electrode potential of the secondary battery assembly 101 (step S13). The controller 508 determines whether the negative electrode potential has reached 0.5 V or not (step S14). If it is determined that the negative electrode potential has not reached 0.5 V (No), the process returns to step S11.

If it is determined that the negative electrode potential has reached 0.5 V (Yes), the charging/discharging section 800 switches the first charging rate to the second charging rate, and charges the secondary battery assembly 101 at a second charging rate (second charging) (step S15). The second charging rate is higher than the first charging rate, and can be set greater than 0.3 It and 1.0 It or less, for example. By switching the charging rate as described after the negative electrode potential has reached 0.5 V, an initial charging time can be shortened. The switching to the second charging rate is performed outside a negative electrode potential range where a gas is especially easily generated in the wound electrode bodies. Thus, even if the secondary battery assembly 101 is charged at a higher charging rate, the advantage of suppressing formation of a black region can be obtained.

Thereafter, the current detector 501 detects a current (Ib) (step S16). Based on the current (Ib), the SOC acquirer 507 acquires an SOC of the secondary battery assembly 101. Then, it is determined whether the SOC of the secondary battery assembly 101 has reached a predetermined SOC or not (step S17). If it is determined that the SOC of the secondary battery assembly 101 has not reached the predetermined SOC (No), the process returns to step S16. If it is determined that the SOC of the secondary battery assembly 101 has reached the predetermined SOC (Yes), the initial charging step S2 is finished (END).

Charging at the first charging rate is preferably performed after the negative electrode potential has reached 0.5 V and before the negative electrode potential reaches 0.4V, and more preferably before the negative electrode potential reaches 0.3V. A temperature in the initial charging step S2 is preferably 45° C. or less, more preferably 15° C. to 35° C., and much more preferably 20° C. to 30° C. The SOC of the secondary battery assembly 101 after initial charging is preferably 5% or more, more preferably 10% or more, and much more preferably 15% or more. The SOC is preferably 50% or less, more preferably 40% or less, and much more preferably 30% or less. To release a gas generated by initial charging, the initial charging step S2 is preferably performed with the injection hole 15 being open (i.e., the battery case 10 being open), but the present disclosure is not limited to this example. In the initial charging step S2, the secondary battery assembly 101 may be restrained in the thickness direction of the wound electrode bodies 20 or may not be restrained.

The second charging does not need to be performed, and step S15 may be omitted when necessary. In such a case, after the determination "Yes" in step S14, the charging rate may not be switched such that the secondary battery assembly 101 is charged with the first charging rate kept (i.e., first charging), and steps S16 and S17 are performed.

As shown in FIG. 5, after the initial charging step S2, an aging step S3 is performed. First, by using the charging/discharging section 800, charging is performed such that the SOC of the secondary battery assembly is 5% or more and 50% or less (preferably 15% or more and 40% or less). The temperature at this time is preferably 45° C. or less (preferably 20° C. or more and 30° C. or less), for example. The charging rate at this time is not specifically limited and can be appropriately set, and is, for example, 1 It or less. In the case of restraining the secondary battery assembly 101 the in initial charging step S2, this restraint is preferably canceled at the start of charging in this step.

Next, aging is started with the secondary battery assembly left in a predetermined temperature condition of the SOC without change. This temperature condition is not specifically limited, and is preferably 50° C. or more and 70° C. or less (e.g., about 60° C.), for example. The time of aging is preferably 5 hours or more and 20 hours or less, for example. As described above, a nonaqueous electrolyte secondary battery in a usable state can be fabricated by carrying out the fabrication method disclosed here.

With this fabrication method, gas generation and gas residue (gas accumulation) can be suppressed by controlling initial charging, and thus, excessive formation of a low-quality film (formation of a black region) can be suppressed. Thus, in the nonaqueous electrolyte secondary battery obtained by performing the fabrication method disclosed here, formation of a black region in the wound electrode bodies is suppressed. This advantage can be evaluated by an XPS analysis of the negative electrode plate after aging. Samples for the XPS analysis are prepared in the manner described in test examples below, and thus, will not be described here in detail.

Figure 8:
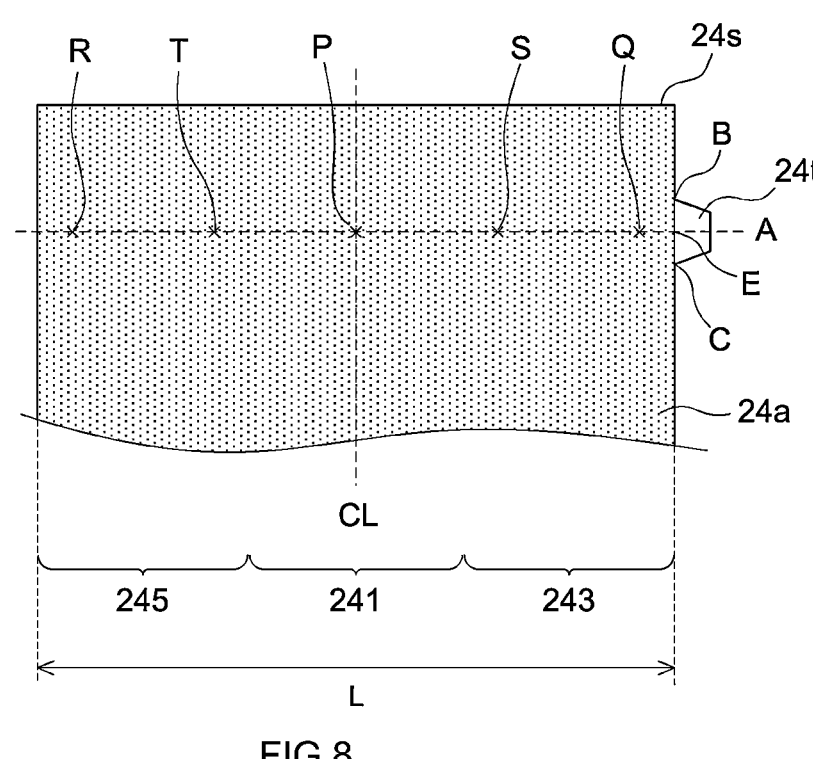
FIG. 8 is a partial plan view illustrating a negative electrode plate of a nonaqueous electrolyte secondary battery fabricated with a fabrication method according to one preferred embodiment.

The negative electrode plate after drying is subjected to a line analysis of lithium fluoride (LiF) by XPS on a line A shown in FIG. 8. As illustrated in FIG. 8, an end of the root of one of the negative electrode tabs 24t closest to a winding start end 24s of the negative electrode plate 24 in a direction orthogonal to the winding axis (see FIG. 4) is defined as an end B. The other end opposite to the end B is defined as an end C. A midpoint of a line segment BC connecting the end B and the end C is defined as a midpoint E. A line A passing through the midpoint E and extending along the winding axis is defined as a line A. As an XPS apparatus, a commercially available apparatus can be used without any particular limitation.

The negative electrode active material layer 24a includes the following regions:

(1) a center region 241 including a center P of the negative electrode active material layer 24a in the winding axis direction, where the length of the center region 241 in the winding axis direction is $\frac{1}{3}L$; and (2) an end region 243 (or an end region 245) located at the side of the negative electrode tab 24t or the opposite side to the negative electrode tab 24t adjacent to the center region 241, where the length of the end region 243 (or the end region 245) in the winding axis direction is 1/3 L.

A LiF intensity of a sample obtained from the negative electrode active material layer 24a on the line A is detected by an analysis of X-ray photoelectron spectroscopy (XPS). The sample derived from (1) may be obtained from any point (e.g., the center P) in the region. The sample derived from (2) may be obtained from any point in the region (e.g., a point located at a distance of $\frac{1}{30}L$ to $\frac{1}{5}L$ toward the point P from an end of the negative electrode active material layer 24a in the winding axis direction). The length L in FIG. 8 represents the width of the negative electrode active material layer 24a.

In an area where a black region is formed, an SEI film is insufficiently formed, and a small amount of LiF is formed. Thus, the LiF intensity decreases. In the nonaqueous electrolyte secondary battery disclosed here, formation of a black region is suppressed, and a ratio ($I_{center}/I_{end}$) of the LiF intensity $I_{center}$ in (1) to the LiF intensity $I_{end}$ in (2) is 0.5 or more. The ratio ($I_{center}/I_{end}$) is preferably 0.6 or more, more preferably 0.7 or more, and is preferably as high as possible. The upper limit of the ratio ($I_{center}/I_{end}$) is approximately 1.0, and can be 1.0 or less, but the present disclosure is not limited to this example. The center P is an intersection point between the line A and the center line CL (e.g., the center line CL of the wound electrode body 20 in FIG. 3) of the negative electrode active material layer 24a in the winding axis direction.

EXAMPLES

Some examples relating to the present disclosure will next be described, but the present disclosure is not intended to be limited to these examples.

<1. Construction of Secondary Battery Assembly>

Lithium nickel cobalt manganese mixed oxide (NCM) as a positive electrode active material, polyvinylidene fluoride (PVdF) as a binder, and acetylene black (AB) as a conductive material were weighed to have a mass ratio of NCM:PVdF:AB=98:1:1, and were mixed in N-methyl-2-pyrrolidone (NMP), thereby preparing positive electrode slurry. The positive electrode slurry was applied onto both surfaces of a long strip positive electrode core material (aluminium foil, thickness 18 µm) and dried. The dried slurry was cut into a predetermined size and rolled by a roll press, thereby obtaining a positive electrode plate including positive electrode active material layers on both sides of a positive electrode core material. The positive electrode active material layer had a density of 3.4 g/cm³ and a thickness of 110 µm at each side. The positive electrode plate had a length of 72 m in the longitudinal direction and a length of 242 mm in the width direction.

Graphite powder (C) as a negative electrode active material, styrene-butadiene rubber (SBR) as a binder, and carboxymethyl cellulose (CMC) as a thickener were weighed to have a mass ratio of C:SBR:CMC=98:1:1, and were mixed in water, thereby preparing negative electrode slurry. The negative electrode slurry was applied onto both sides of a long strip negative electrode core material (copper foil, 12 µm), and dried. The dried negative electrode slurry was cut into a predetermined size and rolled by a roll press, thereby obtaining a negative electrode plate including negative electrode active material layers on both sides of a negative electrode core material. The negative electrode active material layer had a density of 1.4 g/cm³ and a thickness of 200

μm at each side. The negative electrode plate had a length of 80 m in the longitudinal direction and a length of 252 mm in the width direction.

Next, the thus-obtained positive and negative electrode plates were stacked while being opposed to each other with a separator (separator sheet) interposed therebetween. The stacked plates were wound in the sheet longitudinal direction, thereby producing a wound electrode body as illustrated in FIG. 4. The separator included a base material of a polyolefin porous layer, and a heat-resistant layer including alumina and a resin binder. The base material had a thickness of 16 μm, and the heat-resistant layer had a thickness of 4 μm. The heat-resistant layer was formed on a surface toward the positive electrode plate. The separator had a length of 82 m in the longitudinal direction, and a width of 260 mm in the width direction.

The thus-obtained wound electrode body had dimensions as follows:

W: 15 mm;

L1: 280 mm; and

H: 90 mm.

The reference characters are shown in FIG. 3. Specifically, W is a thickness of the wound electrode body 20. L1 is a width of the wound electrode body 20. H is a height of the wound electrode body 20.

Then, the wound electrode body and the lid of the battery case were connected to each other with the positive electrode current collector and the negative electrode current collector interposed therebetween. These connected parts were inserted in the package, and the package and the lid were welded together. Thereafter, the nonaqueous electrolyte was injected from the injection hole of the battery case (sealing plate). The nonaqueous electrolyte was obtained by dissolving, at a concentration of 0.3 weight %, 1 mol/L of $LiPF_6$ as a supporting electrolyte and vinylene carbonate (VC) as an additive (film forming agent) in a mixed solvent containing ethylene carbonate (EC), ethyl methyl carbonate (EMC), and dimethyl carbonate (DMC) at a volume ratio (25° C., 1 atm) of EC:EMC:DMC=30:40:30. In this manner, a test secondary battery assembly was constructed.

<2. Measurement of Remaining Gas Amount in Wound Electrode Body>

First Example

A nonaqueous electrolyte was further injected to the test secondary battery assembly constructed as described above so that the battery case was filled with the nonaqueous electrolyte. In this state, a funnel was inserted in the injection hole of the battery case. Then, initial charging was performed. Specifically, first, charging was performed at a charging rate of 0.1 It until the negative electrode potential of the test secondary battery assembly reached 0.5 V (first charging). At this time, the level of charge (SOC) was 2.5% with respect to a specified capacity (200 Ah) of the test secondary battery assembly. At the time when potential reached the negative electrode potential described above, the charging rate was switched to 0.5 It, and charging was performed until the SOC reached 12% (second charging). Until the SOC reached 12%, the liquid level in the funnel was observed.

Thereafter, aging was performed. Specifically, the injection hole of the sealing plate of the test secondary battery assembly after the initial charging was closed by the sealing member, thereby hermetically sealing the battery case. Then, charging was performed with a current of 0.5 It until the SOC reached 35% with respect to the specified capacity of the test secondary battery assembly. Subsequently, the test secondary battery assembly was left for 15 hours under an environment at 60° C. Then, the volume in which the liquid level increased was measured so that a remaining gas amount in the wound electrode body was obtained. Table 1 shows a result in "Remaining Gas Amount after Initial Charging."

Second Example

In initial charging, first charging was conducted until the negative electrode potential reached 0.3V. At this time, the SOC was 5%. At the time when the potential reached this negative electrode potential, second charging was performed until the SOC reached 12%. Except for this, initial charging and aging were performed in the same manner as the first example, and a remaining gas amount in the second example was measured.

Third Example

In initial charging, first charging was performed until the negative electrode potential reached 0.16 V. At this time, the SOC was 12%. In this example, no second charging was performed. Except for this, initial charging and aging were performed in the same manner as the first example, and a remaining gas amount in the third example was measured. In Table 1, "-" in "SOC (%) after First Charging" and "Charging Rate" of "Second Charging" represents that no second charging was performed.

Fourth Example

In initial charging, first charging was performed with a current of 0.2 It. Except for this, initial charging and aging were performed in the same manner as the first example, and a remaining gas amount in the fourth example was measured.

Fifth Example

In initial charging, first charging was performed with a current of 0.2 It. Except for this, initial charging and aging were performed in the same manner as the second example, and a remaining gas amount in the fifth example was measured.

Sixth Example

In initial charging, first charging was performed with a current of 0.2 It. Except for this, initial charging and aging were performed in the same manner as the third example, and a remaining gas amount in the sixth example was measured.

Seventh Example

In initial charging, first charging was performed with a current of 0.3 It. Except for this, initial charging and aging were performed in the same manner as the first example, and a remaining gas amount in the seventh example was measured.

First Comparative Example

In initial charging, first charging was performed until the negative electrode potential reached 0.6 V. At this time, the SOC was 1.5%. At the time when the potential reached this negative electrode potential, second charging was performed until the SOC reached 12%. Except for this, initial charging and aging were performed in the same manner as the fourth example, and a remaining gas amount in the first comparative example was measured.

Second Comparative Example

In initial charging, first charging was performed with a current of 0.4 It. Except for this, initial charging and aging were performed in the same manner as the first example, and a remaining gas amount in the second comparative example was measured.

Third Comparative Example

In initial charging, first charging was performed with a current of 0.5 It. Except for this, initial charging and aging were performed in the same manner as the third example, and a remaining gas amount in the third comparative example was measured.

<3. LiF Intensity Measurement by XPS>

The test secondary battery assembly in each example after aging was discharged with a current of 0.5 C until the level of charge with respect to the specified capacity of the test secondary battery reached 0%. Next, the test secondary battery of each example was disassembled, and the negative electrode plate was washed with a cleaning solution (dimethyl carbonate (DMC), 100 vol %) and dried. The dried negative electrode plate was subjected to a line analysis of LiF by XPS on the line A shown in FIG. 8. As an XPS apparatus, Quantera SXM manufactured by Univac-PHI was used. An excitation X ray used in measurement was a monochromatic Al Kα ray (1486.6 eV), an X-ray diameter was 200 μm, and a photoelectron detection angle was 45°.

Then, the center region on the line A includes the following points:

a center P of the negative electrode active material layer 24a in the winding axis direction;

points Q to T in an end region on the line A:

point Q: a point at a distance of 10 mm from an end of the negative electrode active material layer 24a in the winding axis direction at the side of the negative electrode tab 24t, toward the center P;

point R: a point at a distance of 10 mm from the end of the negative electrode active material layer 24a in the winding axis direction opposite to the negative electrode tab 24t, toward the center P;

point S: a midpoint between the center P and the point Q; and point T: a midpoint between the center P and the point R.

A ratio ($I_{center}/I_{end}$) of a LiF intensity $I_{center}$ at the center P to a LiF intensity $I_{end}$ at any one of the points Q to T was calculated with respect to LiF intensities obtained from the samples of the negative electrode active material layer. Table 1 shows the results in "LiF Intensity Ratio." With respect to obtaining the sample from the end region in each example, "End Region" in Table 1 shows a sample obtained portion of any one of the points Q to T at which the sample was obtained.

<4. Evaluation of Capacity Retention Rate>

To the test secondary battery assembly constructed in the section 1. above, initial charging and aging were performed with the injection hole being opened and unsealed, thereby fabricating a test secondary battery of each example. Conditions for initial charging and aging in each example were described in the section 2. above. The test secondary battery was discharged to 3.0 V with a current of 0.5 It. Next, the test secondary battery was charged to 4.1 V with a current of 0.5 It. Thereafter, the test secondary battery was discharged to 3.0 V with a current of 0.5 It again. The capacity of the battery at this time was defined as an initial capacity. On the test secondary battery after measurement of the initial capacity as described above, 500 cycles of charging and discharging at 3.0 V to 4.1 V were performed with a current of 0.4 It, and the battery capacity at this time was obtained as a capacity after endurance.

Then, a capacity retention rate (%) was calculated from Equation (B):

$$\text{Capacity retention rate (\%)}=(\text{Capacity After Endurance})/(\text{Initial Capacity})\times100 \quad\quad (B)$$

Table 1 shows the result in "Capacity Retention Rate (%)."

TABLE 1

| | Initial Charging | | | | | Battery Evaluation | | | Battery Characteristics |
| | First Charging | | | | | | | | |
| | Negative Electrode Potential | SOC after | Second Charging | SOC after | Remaining Gas Amount after | XPS Analysis | | Cycle Characteristics Capacity |
| | Charging Rate (It) | after First Charging (V) | First Charging (%) | Charging Rate (It) | Initial Charging (%) | Initial Charging (cc) | LiF Intensity Ratio | End Region | Retention Rate (%) |
|---|---|---|---|---|---|---|---|---|---|
| Example 1 | 0.1 | 0.5 | 2.5 | 0.5 | 12 | 52 | 0.71 | Q | 91 |
| Example 2 | ↑ | 0.3 | 5 | 0.5 | ↑ | 51 | 0.74 | ↑ | 90 |
| Example 3 | ↑ | 0.16 | — | — | ↑ | 50 | 0.75 | ↑ | 93 |
| Example 4 | 0.2 | 0.5 | 2.5 | 0.5 | ↑ | 54 | 0.69 | ↑ | 86 |
| Example 5 | ↑ | 0.3 | 5 | 0.5 | ↑ | 54 | 0.71 | ↑ | 88 |
| Example 6 | ↑ | 0.16 | — | — | ↑ | 53 | 0.72 | ↑ | 89 |
| Example 7 | 0.3 | 0.5 | 2.5 | 0.5 | ↑ | 58 | 0.65 | ↑ | 83 |
| | | | | | | | 0.66 | R | |
| | | | | | | | 0.63 | S | |
| | | | | | | | 0.64 | T | |
| Comparative Example 1 | 0.2 | 0.6 | 1.5 | 0.5 | ↑ | 60 | 0.43 | Q | 68 |
| Comparative Example 2 | 0.4 | 0.5 | 2.5 | 0.5 | ↑ | 61 | 0.36 | ↑ | 63 |

TABLE 1-continued

| | Initial Charging | | | | Battery Evaluation | | | Battery Characteristics |
| | First Charging | | | | | | | |
| | | Negative Electrode Potential | SOC after | Second Charging | SOC after | Remaining Gas Amount after | XPS Analysis | | Cycle Characteristics Capacity |
| | Charging Rate (It) | after First Charging (V) | First Charging (%) | Charging Rate (It) | Initial Charging (%) | Initial Charging (cc) | LiF Intensity Ratio | End Region | Retention Rate (%) |
|---|---|---|---|---|---|---|---|---|---|
| Comparative Example 3 | 0.5 | 0.16 | — | — | ↑ | 62 | 0.32 | ↑ | 58 |

<5. Results and Discussion>

As shown in Table 1, in each of the secondary batteries fabricated with the method of the first through seventh examples in which in the initial charging step, the test secondary battery assembly was charged at the first charging rate until the negative electrode potential with respect to the lithium metal reference (vs. Li/Li+) of the test secondary battery assembly reached at least 0.5 V, and the remaining gas amount at the end of the initial charging step is 58 cc, the LiF intensity ratio was 0.5 or more. That is, it was found that in the secondary batteries according to the first through seventh examples, formation of a black region was suppressed. The capacity retention rates of the secondary batteries were 80% or more, and thus, it was also observed that degradation of battery characteristics was suppressed. On the other hand, in the first through third comparative examples in which the remaining gas amount at the end of the initial charging step was not 58 cc or less, the LiF intensity ratios were less than 0.5, and suppression of formation of a black region was not observed. The capacity retention rates (%) after cycle tests were lower than 70%, and thus, suppression of degradation of battery performance was not observed.

It was found that formation of a black region can be suppressed by the technique disclosed here in which the test secondary battery assembly is charged at the first charging rage until the negative electrode potential reaches at least 0.5 V in initial charging of the secondary battery assembly, and the remaining gas amount is 58 cc at the end of the initial charging step. It was also found that in the secondary battery in which formation of a black region is suppressed (i.e., a secondary battery in which the LiF intensity ratio in the negative electrode active material layer is within a predetermined range), degradation of battery performance (e.g., capacity retention rate after charging/discharging cycles) can be suppressed.

Specific examples of the technique disclosed here have been described in detail hereinbefore, but are merely illustrative examples, and are not intended to limit the scope of claims. The technique disclosed here include various modifications and changes of the above specific examples.

What is claimed is:

1. A method for fabricating a nonaqueous electrolyte secondary battery comprising a flat wound electrode body comprising a positive electrode plate, a negative electrode plate, and a separator, the positive electrode plate and the negative electrode plate being wound with the separator interposed therebetween, a nonaqueous electrolyte containing a supporting electrolyte comprising lithium and fluorine, and a battery case housing the wound electrode body and the nonaqueous electrolyte, the method comprising:

an assembly step of housing the wound electrode body and the nonaqueous electrolyte in the battery case to construct a secondary battery assembly; and an initial charging step of performing initial charging on the secondary battery assembly, wherein in the initial charging step, the secondary battery assembly is charged at a first charging rate until a negative electrode potential with respect to a lithium metal reference (vs. Li/Li+) of the secondary battery assembly reaches a predetermined value ranging from 0.16 V to 0.5 V, an amount of a gas remaining in the wound electrode body at end of the initial charging step is 58 cc or less, the battery case has an injection hole for the nonaqueous electrolyte, in the assembly step, the nonaqueous electrolyte is injected into the battery case through the injection hole, and the initial charging step is performed with the injection hole being open, wherein after the initial charging step, the injection hole is sealed with a sealing member, and after the negative electrode potential reaches the predetermined value, the secondary battery assembly is charged at a second charging rate which is larger than the first charging rate.

2. The method according to claim 1, wherein the negative electrode plate comprises a negative electrode core material and a negative electrode active material layer disposed on the negative electrode core material, and the negative electrode active material layer of the wound electrode body in a winding axis direction has a length L of at least 20 cm.

3. The method according to claim 1, wherein a state of charge of the secondary battery assembly after initial charging is 15% or more and 30% or less.

4. The method according to claim 1, wherein charging at the first charging rate is performed until the negative electrode potential reaches 0.4V.

5. The method according to claim 1, wherein charging at the first charging rate is performed until the negative electrode potential reaches 0.3V.

6. A method for fabricating a nonaqueous electrolyte secondary battery comprising a flat wound electrode body comprising a positive electrode plate, a negative electrode plate, and a separator, the positive electrode plate and the negative electrode plate being wound with the separator interposed therebetween, a nonaqueous electrolyte containing a supporting electrolyte comprising lithium and fluorine, and a battery case housing the wound electrode body and the nonaqueous electrolyte, the method comprising:

an assembly step of housing the wound electrode body and the nonaqueous electrolyte in the battery case to construct a secondary battery assembly; and an initial charging step of performing initial charging on the secondary battery assembly, wherein in the initial charging step, the secondary battery assembly is charged at a first charging rate until a negative electrode potential with respect to a lithium metal reference (vs. Li/Li+) of the secondary battery assembly reaches a predetermined value ranging from 0.16 V to 0.5 V, an amount of a gas remaining in the wound electrode body at end of the initial charging step is 58 cc or less, the negative electrode plate comprises a negative electrode core material and a negative electrode active material layer disposed on the negative electrode core material, the negative electrode active material layer of the wound electrode body in a winding axis direction has a length L of at least 20 cm, a state of charge of the secondary battery assembly after initial charging is 15% or more and 30% or less, the battery case has an injection hole for the nonaqueous electrolyte, in the assembly step, the nonaqueous electrolyte is injected into the battery case through the injection hole, and the initial charging step is performed with the injection hole being open, wherein after the initial charging step, the injection hole is sealed with a sealing member, and after the negative electrode potential reaches the predetermined value, the secondary battery assembly is charged at a second charging rate which is larger than the first charging rate.

7. The method according to claim 1, wherein when the negative electrode potential reaches the predetermined value, the first charging rate is switched to the second charging rate.

8. The method according to claim 1, wherein in the initial charging step, the secondary battery assembly is charged at the first charging rate until a state of charge of the secondary battery assembly reaches a predetermined state of charge which is between 5% or more and 50% or less, and then an aging treatment for 5 hours to 20 hours at 50° C. or more and 70° C. or less is performed.

9. The method according to claim 6, wherein in the initial charging step, the secondary battery assembly is charged at the first charging rate until a state of charge of the secondary battery assembly reaches a predetermined state of charge which is between 5% or more and 50% or less, and then an aging treatment for 5 hours to 20 hours at 50° C. or more and 70° C. or less is performed.

10. The method according to claim 6, wherein charging at the first charging rate is performed until the negative electrode potential reaches 0.3V.

* * * * *